(12) United States Patent
Li et al.

(10) Patent No.: US 8,479,294 B1
(45) Date of Patent: Jul. 2, 2013

(54) ANTI-MALWARE SCAN MANAGEMENT IN HIGH-AVAILABILITY VIRTUALIZATION ENVIRONMENTS

(75) Inventors: Ching-Yi Li, Kaohsiung (TW); Kevin Boyce, Chelsea (CA)

(73) Assignee: Trend Micro Incorporated, Tokyo (JP)

( * ) Notice: Subject to any disclaimer, the term of this patent is extended or adjusted under 35 U.S.C. 154(b) by 179 days.

(21) Appl. No.: 13/028,066

(22) Filed: Feb. 15, 2011

(51) Int. Cl.
*G06F 21/00* (2006.01)

(52) U.S. Cl.
USPC .................................. 726/24; 726/23; 726/25

(58) Field of Classification Search
USPC ........................................................... 726/24
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Ismael et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |
| 6,842,897 B1 | 1/2005 | Beadle et al. | |
| 6,941,552 B1 | 9/2005 | Beadle et al. | |
| 7,039,691 B1 | 5/2006 | Turnidge | |
| 7,191,211 B2 | 3/2007 | Tuli | |
| 7,290,129 B2 | 10/2007 | Chebolu et al. | |
| 7,506,257 B1 | 3/2009 | Chavez et al. | |
| 7,634,811 B1 | 12/2009 | Kienzle et al. | |
| 2001/0054062 A1 | 12/2001 | Ismael et al. | |
| 2002/0129281 A1 | 9/2002 | Hatfalvi et al. | |
| 2003/0041106 A1 | 2/2003 | Tuli | |
| 2004/0148608 A1 | 7/2004 | Gendreau et al. | |
| 2004/0158830 A1 | 8/2004 | Chung et al. | |
| 2004/0230643 A1 | 11/2004 | Thibault et al. | |
| 2005/0188361 A1 | 8/2005 | Cai et al. | |
| 2005/0198485 A1 | 9/2005 | Nguyen et al. | |
| 2005/0246176 A1 | 11/2005 | Creamer et al. | |
| 2006/0112342 A1 | 5/2006 | Bantz et al. | |
| 2007/0199058 A1 | 8/2007 | Baumgart et al. | |

FOREIGN PATENT DOCUMENTS

WO  WO2005066786  7/2005

OTHER PUBLICATIONS

Hypervisor—Wikipedia, the free encyclopedia, pp. 1-7, [retrieved on Jan. 28, 2011], retrieved from the internet: http://en.wikipedia.org/wiki/Hypervisor.

Virtual machine—Wikipedia, the free encyclopedia, pp. 1-8 [retrieved on Dec. 3, 2009], retrieved from the internet: http://en.wikipedia.org/wiki/Virtual_machine.

(Continued)

*Primary Examiner* — Justin T Darrow
(74) *Attorney, Agent, or Firm* — Okamoto & Benedicto LLP

(57) ABSTRACT

A computer system for high-availability virtualization environment includes an originating host machine hosting several virtual machines. Anti-malware scanning on a virtual machine may be initiated in the originating host machine. Prior to completion of the anti-malware scanning, the virtual machine may be migrated to another, destination host machine. The anti-malware scanning on the virtual machine may be resumed in the destination host machine based on a scan state of the virtual machine. The anti-malware scanning of the virtual machine may be suspended and scheduled for execution in the destination host machine. A scan cache of the virtual machine may be preserved depending on information from the scan state. For example, the scan cache may be preserved and employed in the destination host machine when the originating and destination host machines use the same scan engine and pattern version.

20 Claims, 4 Drawing Sheets

OTHER PUBLICATIONS

VMware White Paper—Virtualization Overview, pp. 1-10 [retrieved on Mar. 26, 2007], retrieved from the internet: http://www.vmware.com/solutions/whitepapers.html.

VMware White Paper—Virtualization: Architectural Considerations and Other Evaluation Criteria, pp. 1-13 [retrieved on Mar. 26, 2007], retrieved from the internet: http://www.vmware.com/solutions/whitepapers.html.

U3 brings the power of portable software to your USB flash drive—make a smart drive!, 2 sheets, 2005-2006 [retrieved on Mar. 26, 2007], retrieved from the internet: http://www.u3.com/.

Creating Signed Remote Applications—Creating Applications with Mozilla, pp. 1-4 [retrieved on Mar. 26, 2007], retrieved from the internet: http://www.csie.ntu.edu.tw/~piap/docs/CreateMozApp/mozilla-chp-12-sect-6.html.

VMware—Wikipedia, the free encyclopedia, pp. 1-8 [retrieved on Mar. 26, 2007], retrieved from the internet: http://en.wikipedia.org/wiki/VMware.

ANTI-MALWARE SCAN MANAGEMENT IN HIGH-AVAILABILITY VIRTUALIZATION ENVIRONMENTS

BACKGROUND OF THE INVENTION

1. Field of the Invention

The present invention relates generally to computer security, and more particularly but not exclusively to methods and apparatus for anti-malware scanning in virtualization environments.

2. Description of the Background Art

Virtual machines, in general, are well known in the art of computer science. Generally speaking, a virtual machine is a software implementation of a machine (i.e., a computer) that executes programs like a physical machine. Multiple virtual machines may run on a single computer hardware platform, which is also referred to as "host machine." Although the virtual machines run in the same host machine, each virtual machine has its own operating system and functions as a computing environment separate from the other virtual machines. Still, the virtual machines share the same disk I/O (input/output) and processor resources of the same host machine.

Malware include computer viruses, worms, Trojans, rootkits, spyware and other forms of malicious codes. A virtual machine may include an anti-malware to guard against malware. Typical anti-malware comprises a scan engine and a pattern. The pattern comprises signatures of known malware and other information for identifying malware. In an example operation, the anti-malware may perform an anti-malware scan to compare data against the pattern using a pattern-matching algorithm. Because an anti-malware scan involves a lot of disk I/O and processor computation, anti-malware scanning often significantly impacts the performance of the target virtual machine. Simultaneous anti-malware scanning on several virtual machines running on the same host machine may cause system thrashing.

Embodiments of the present invention pertain to anti-malware scanning on virtual machines, and are especially advantageous in high-availability virtualization environments where virtual machines are dynamically migrated from one host machine to another.

SUMMARY

In one embodiment, a computer system for high-availability virtualization environment includes an originating host machine hosting several virtual machines. Anti-malware scanning on a virtual machine may be initiated in the originating host machine. Prior to completion of the anti-malware scanning, the virtual machine may be migrated to another, destination host machine. The anti-malware scanning on the virtual machine may be resumed in the destination host machine based on a scan state of the virtual machine. The anti-malware scanning on the virtual machine may be suspended and scheduled for execution in the destination host machine. A scan cache of the virtual machine may be preserved depending on information from the scan state. For example, the scan cache may be preserved and employed in the destination host machine when the originating and destination host machines use the same scan engine and pattern version.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of anti-malware scanning for illustration purposes only. In light of the present disclosure, those of ordinary skill in the art will appreciate that embodiments of the present invention may be generally employed in computer security and content filtering applications using a security virtual machine. For example, embodiments of the present invention may also be employed in other applications where a security virtual machine performs file integrity scanning, logs inspection, vulnerabilities scanning, and data leakage prevention scanning on or for other, separate virtual machines running in the same host machine as the security virtual machine.

Figure 1:
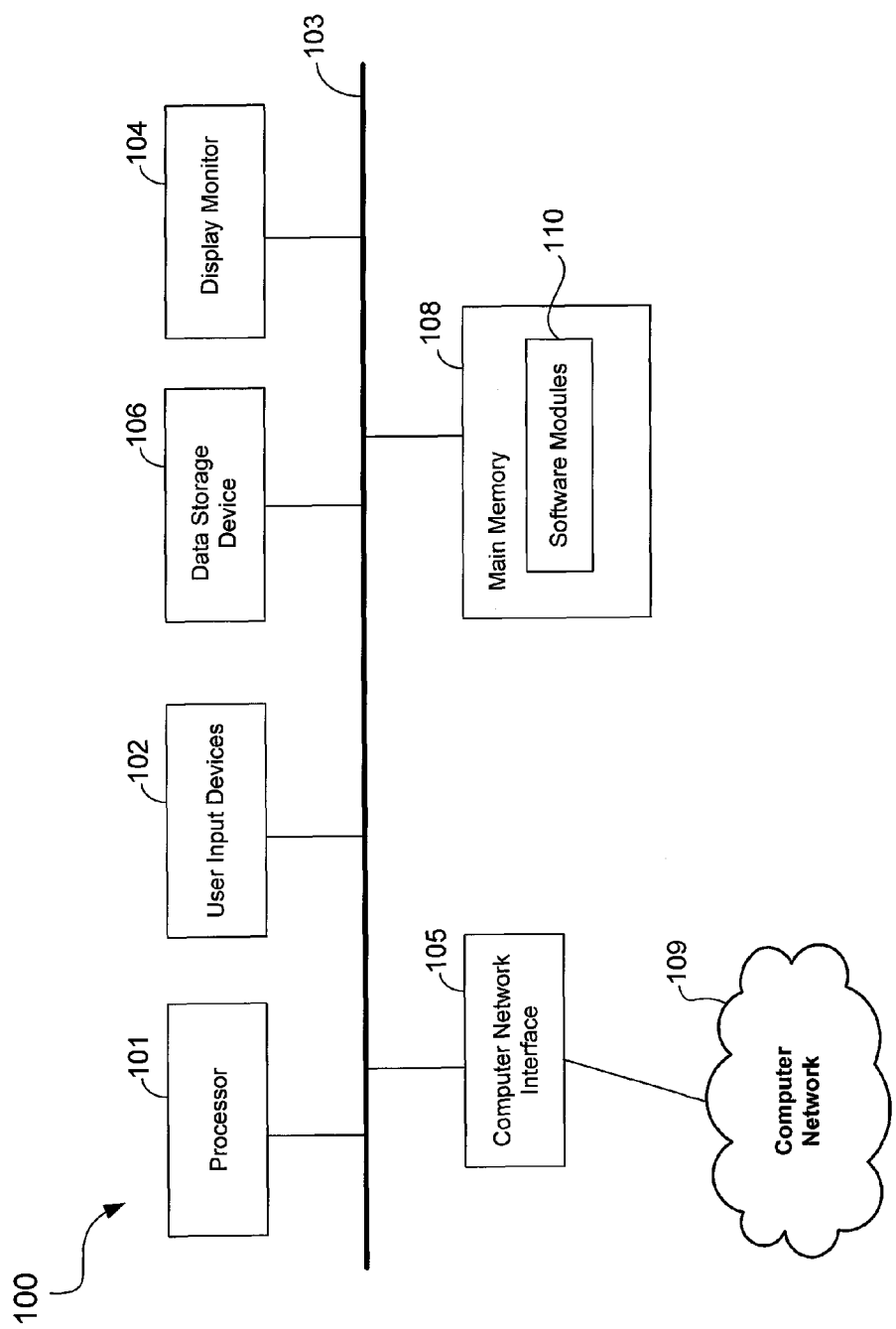
FIG. 1 shows a schematic diagram of a computer in accordance with an embodiment of the present invention.

FIG. 1 shows a schematic diagram of a computer 100 in accordance with an embodiment of the present invention. The computer 100 may be employed as a server computer for hosting a plurality of virtual machines described below. The computer 100 may be in the form of a security appliance, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109.

The computer 100 is a particular machine as programmed with software modules 110. The software modules 110 comprise computer-readable program code stored non-transitory in the main memory 108 for execution by the processor 101.

The software modules 110 may comprise computer-readable program code for virtual machines. The software modules 110 may be loaded from the data storage device 106 to the main memory 108. The software modules 110 may also be made available in other computer-readable storage medium including optical disk, flash drive, and other memory device.

One way of managing anti-malware scans in a virtualization environment is to off-load scanning to a separate virtual machine, referred to as a "security virtual machine." The security virtual machine may receive scanning requests from individual virtual machines running in the host machine, and schedule the scanning as resources allow. To avoid impacting the performance of the host machine, the security virtual machine may manage a fixed number of on-demand scans (e.g., one scanning task) running on the host machine at the same time. Each virtual machine may also have a thin agent for coordinating scanning with the security virtual machine. The thin agent may maintain a scan cache that indicates results of scanned files, avoiding repeated scanning of the same file.

Figure 2:
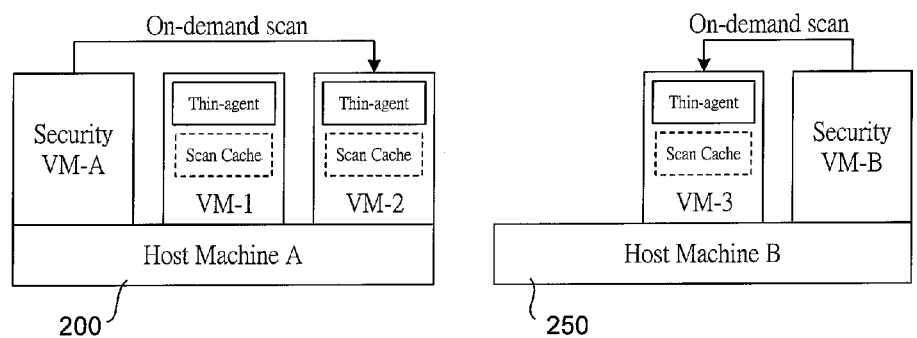
FIG. 2 schematically illustrates anti-malware scanning in a virtualization environment.

The just-mentioned anti-malware scanning architecture is illustrated in FIG. 2, which schematically shows a computer in the form of a host machine 200 (labeled as "Host Machine A") hosting a plurality of virtual machines VM-1 and VM-2. In the example of FIG. 2, a separate virtual machine in the form of a security virtual machine VM-A provides anti-malware scanning for virtual machines hosted by the host machine 200, including virtual machines VM-1 and VM-2. The security virtual machine VM-A may perform anti-malware scanning for each virtual machine on-demand, i.e., when requested by the virtual machine, per a managed schedule. That is, the security virtual machine VM-A scans files in a virtual machine when requested, but not necessarily right away. Similarly, a separate computer in the form of a host machine 250 (labeled as "Host Machine B") may include a security virtual machine VM-B to provide on-demand anti-malware scanning to virtual machines hosted by the host machine 250, including virtual machine VM-3 and other virtual machines hosted by the host machine 250. Each of virtual machines VM-1, VM-2, and VM-3 may have a thin agent and a scan cache. Unlike an on-demand scan, which is a scheduled task, a real-time scan is performed by a security virtual machine in real-time (not scheduled) as requested by a virtual machine. The scan cache advantageously limits the number of real time scan events that need to be performed by the security, virtual machine.

In a high-availability virtualization environment, each virtual machine may be dynamically migrated between host machines to redistribute or optimize loading, or to schedule downtime for a host machine. If a virtual machine is undergoing anti-malware scanning while being migrated from one host machine to another, the anti-malware scan typically cannot be correctly continued in the other host machine. Although the security virtual machine in the other host machine may restart the anti-malware scan, the restarted anti-malware scan may cause performance degradation. It is also possible that the virtual machine may be dynamically migrated yet again to another host machine before the anti-malware scan completes. In that case, the anti-malware scan may take a very long time to complete or may not complete at all. To compound this problem, the request for anti-malware scan from the migrated virtual machine may disturb anti-malware scan scheduling in the destination host machine, and result in more scanning tasks running in the destination host machine, possibly causing system thrashing. Furthermore, security virtual machines may use different anti-malware scan engine and pattern versions, making cached status of migrated virtual machines unusable in other host machines even though their anti-malware are the same product from the same vendor. This last problem may be alleviated by always purging the scan cache as a workaround, but the anti-malware scan performance may still be severely degraded.

Figure 3:
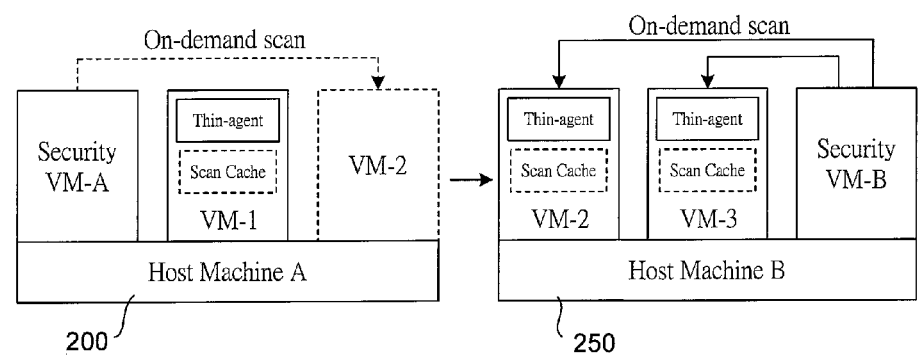
FIG. 3 schematically illustrates anti-malware scanning in a high-availability virtualization environment with dynamic migration.

The above-mentioned problems with anti-malware scanning in high-availability virtualization environments is schematically illustrated in FIG. 3, which shows the components first discussed in FIG. 2. In the example of FIG. 3, the security virtual machine VM-A of the host machine 200 is in the middle of performing an on-demand scan on the virtual machine VM-2. In this example, the on-demand scan is scanning the files of the virtual machine VM-2 for malware.

In a high-availability environment, a virtual machine is expected to be dynamically migrated from one host machine to another. The computer system of FIG. 3 is a high-availability system in that the virtual machines hosted by the host machine 200 are expected to be dynamically migrated to the host machine 250, and vice versa, to balance load distribution, schedule host maintenance, or other reasons. In the example of FIG. 3, this is illustrated with the migration of the virtual machine VM-2 from the host machine 200 to the host machine 250. In this example, however, the on-demand scan of the virtual machine VM-2 by the security virtual machine VM-A has not completed when the virtual machine VM-2 has finished migration to the host machine 250. That is, the anti-malware scanning of files of the virtual machine VM-2 has yet to finish when the migration was dynamically performed. In the host machine 250, the newly migrated virtual machine VM-2 may request the security virtual machine VM-B to restart the anti-malware scanning initiated in the host machine 200, but this adds another anti-malware scan task in the host machine 250. Depending on how well the anti-malware scanning is managed in the host machine 250, the additional scan task may result in two or more on-demand scans simultaneously running in the host machine 250, possibly overloading the host machine 250.

Figure 4:
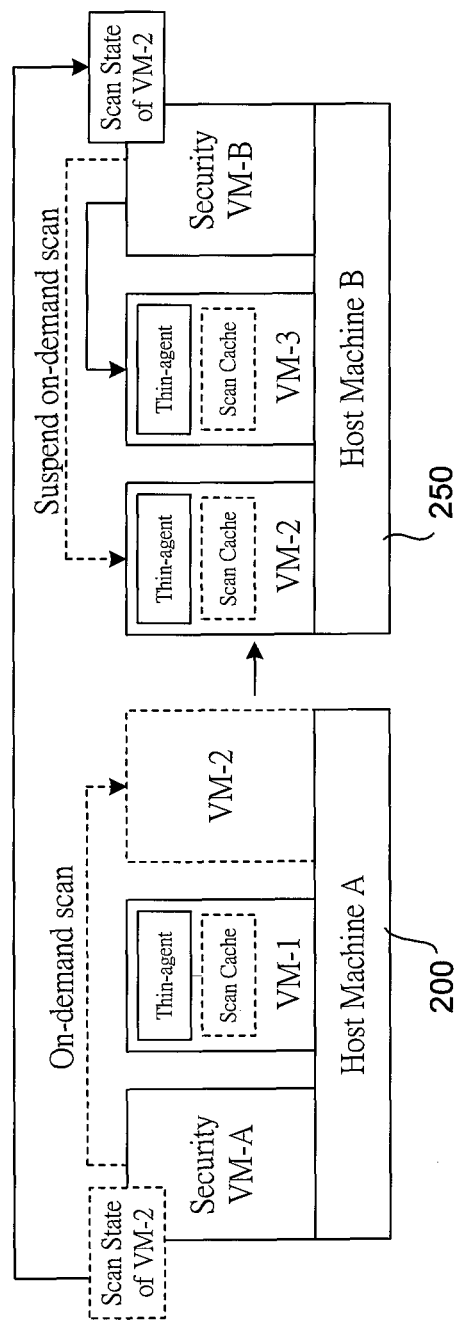
FIG. 4 schematically illustrates management of anti-malware scanning in high-availability virtualization environments in accordance with an embodiment of the present invention.

FIG. 4 schematically illustrates management of anti-malware scanning in high-availability virtualization environments in accordance with an embodiment of the present invention. FIG. 4 is explained using components discussed in conjunction with FIGS. 2 and 3, but suitably configured to perform the anti-malware scan management technique described with reference to FIGS. 4 and 5.

In the example of FIG. 4, the virtual machine VM-2 is being dynamically migrated from the host machine 200 to the host machine 250. Like in FIG. 3, the migration of the virtual machine VM-2 occurs before an on-demand scan by the security virtual machine VM-A on the virtual machine VM-2 is completed. In the example of FIG. 4, however, the scan state of the anti-malware scan of the virtual machine VM-2 is saved in the host machine 200, and migrated with the virtual machine VM-2 to the host machine 250. The scan state may indicate the anti-malware scan engine and pattern version, and other information indicating the anti-malware used to scan the virtual machine VM-2 in the host machine 200. The scan state may also indicate the state of the anti-malware scan just before the virtual machine VM-2 is migrated, including how far along the scan, which files have been scanned, results of the scan, and other information about the anti-malware scan. The scan state of a virtual machine may be saved by way of a hypervisor of the host machine, for example.

As schematically illustrated in FIG. 4, the virtual machine VM-2 and its scan state are migrated to the host machine 250. The virtual machine VM-2 includes a scan cache (see FIG. 2), which goes with the virtual machine VM-2. In the host machine 250, the scan state of the virtual machine VM-2 is received and read by the security virtual machine VM-B. The security virtual machine VM-B compares the scan engine and pattern version used by the security virtual machine VM-A with those employed by the security virtual machine VM-B. The security virtual machine VM-B keeps the scan cache of the virtual machine VM-2 when the security virtual machines VM-B and VM-A use the same scan engine and pattern version. Otherwise, when the security virtual machines VM-B and VM-A use different scan engine or pattern versions, the security virtual machine VM-B purges the scan cache of the virtual machine VM-2. For example, the security virtual machine VM-B may send a signal to the thin client of the virtual machine VM-2 to purge its scan cache.

In the host machine 250, the security virtual machine VM-B restores the virtual machine VM-2 scan task that was originally started in the host machine 200. Thereafter, the security virtual machine VM-B suspends the virtual machine VM-2 scan task, and adds the virtual machine VM-2 scan task to the anti-malware scan queue for scheduling. The security virtual machine VM-B schedules the virtual machine VM-2 scan task. The security virtual machine VM-B then resumes the virtual machine VM-2 scan task as scheduled. The security virtual machine VM-B may also restart the scan task from scratch depending on the scan state, such as when the security virtual machines VM-A and VM-B use different scan engine or pattern versions.

Figure 5:
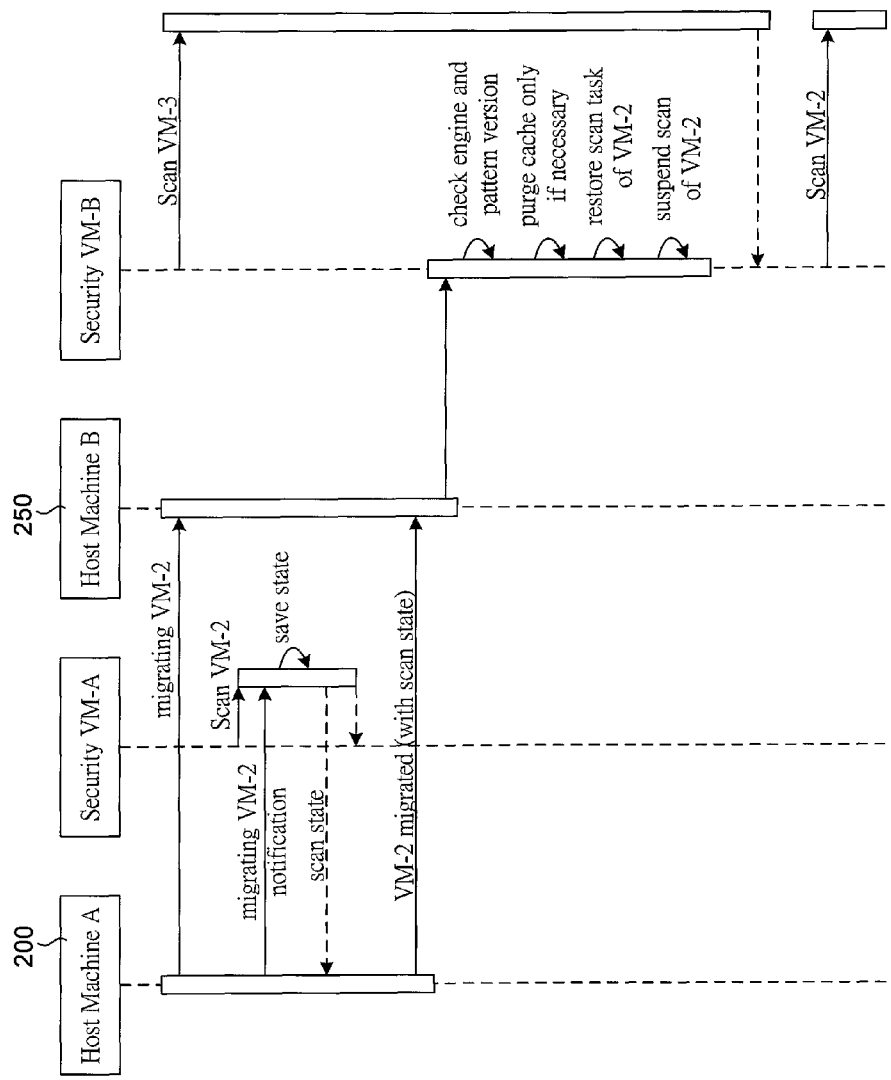
FIG. 5 shows a flow diagram of a method of managing anti-malware scanning in high-availability virtualization environments, in accordance with an embodiment of the present invention.

FIG. 5 shows a flow diagram of a method of managing anti-malware scanning in high-availability virtualization environments, in accordance with an embodiment of the present invention. As can be appreciated, the host machine 200 performs the actions executed in the host machine 200, including the actions of the security virtual machine VM-A and all virtual machines hosted in the host machine 200. Similarly, the host machine 250 performs the actions executed in the host machine 250, including the actions of the security virtual machine VM-B and all virtual machines hosted in the host machine 250.

In the example of FIG. 5, the host machine 200 is in the process of migrating the virtual machine VM-2 to the host machine 250, and so informs the host machine 250 (FIG. 5, "migrating VM-2"). When the migration is started, the security virtual machine VM-A running in the host machine 200 is in the middle of scanning the virtual machine VM-2 for malware (FIG. 5, "Scan VM-2"). The host machine 200 (or a management server, depending on the architecture) also informs the security virtual machine VM-A that the virtual machine VM-2 is being migrated (FIG. 5, second "migrating VM-2"). In response, the scan state of the ongoing scan of the virtual machine VM-2 is saved (FIG. 5, "save state") at the host machine 200 (FIG. 5, "scan state"), e.g., using the hypervisor of the host machine 200. The security virtual machine VM-A then stops the anti-malware scan of the virtual machine VM-2. The virtual machine VM-2 is thereafter migrated to the host machine 250 (FIG. 5, "VM-2 migrated (with scan state)").

In the host machine 250, the security virtual machine VM-B is currently scanning the virtual machine VM-3 (FIG. 5, "Scan VM-3"). When the virtual machine VM-2 and its scan state are migrated to the host machine 250, the security virtual machine VM-B checks the scan state to determine the scan engine and pattern version (FIG. 5, "check engine and pattern version") of the security virtual machine VM-A, i.e., the scan engine and pattern version used to scan the virtual machine VM-2 in the previous host machine. To take advantage of the scan performed in the host machine 200, the security virtual machine VM-B will try to preserve the scan cache of the virtual machine VM-2 (FIG. 5, "purge cache only if necessary"). In one embodiment, the security virtual machine VM-B will preserve and use the scan cache of the virtual machine VM-2 when the security virtual machines VM-B and VM-A use the same scan engine and pattern version. Otherwise, when the virtual machines VM-B and VM-A have different scan engine or pattern versions, the security virtual machine VM-B will purge the scan cache of the virtual machine VM-2.

The security virtual machine VM-B restores in the host machine 250 the scan task of the virtual machine VM-2 that was started in the host machine 200 but interrupted by the migration (FIG. 5, "restore scan task"). The security virtual machine VM-B thereafter suspends the scan task ("FIG. 5, "suspend scan of VM-2"), and schedules the scan task for execution in accordance with the schedule. For example, the security virtual machine VM-B may complete anti-malware scanning of the virtual machine VM-3 before starting anti-malware scanning of the virtual machine VM-3 in the host machine 250.

When the scan task is up for execution, the security virtual machine VM-B restarts the scan task (FIG. 5, "Scan VM-2") based on the scan state. For example, assuming the security virtual machines VM-B and VM-A have the same scan engine and pattern version, the security virtual machine VM-B restarts the scan task from where the security virtual machine VM-A left off according to the scan state. Otherwise, the security virtual machine VM-B starts the anti-malware scanning of the virtual machine VM-2 from scratch. Either way, the scanning of the virtual machine VM-2 in the host machine 250 is scheduled properly, avoiding conflict with existing scan tasks in the host machine 250 and preventing overloading of the host machine 250. In the case where security virtual machines VM-B and VM-A have the same scan engine and pattern version, the security virtual machine VM-B can take advantage of the previous scanning performed by the security virtual machine VM-A, improving anti-malware scan performance in the host machine 250.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of managing scanning in a virtualization environment, the method comprising:
   initiating scanning on a first virtual machine hosted in a first host machine that is hosting a first plurality of virtual machines, the first virtual machine being one of the first plurality of virtual machines;
   saving a scan state of the first virtual machine, the scan state indicating status of the anti-malware scanning on the first virtual machine initiated in the first host machine;
   migrating the first virtual machine and the scan state to a second host machine that is hosting a second plurality of virtual machines; and
   performing scanning on the first virtual machine in the second host machine based on information from the scan state.

2. The method of claim 1 further comprising:
   resuming in the second host machine the scanning on the first virtual machine initiated in the first host machine.

3. The method of claim 1 further comprising:
   purging in the second host machine a scan cache of the first virtual machine when the first host machine and the second host machine use different versions of scan engine or pattern for anti-malware scanning.

4. The method of claim 1 further comprising:
using a scan cache of the first virtual machine to scan the first virtual machine for malware in the second host machine when the first host machine and the second host machine use a same version of scan engine and pattern for anti-malware scanning.

5. The method of claim 1 further comprising:
suspending scanning on the first virtual machine in the second host machine.

6. The method of claim 5 further comprising
completing scanning on a second virtual machine in the second host machine before scanning the first virtual machine in the second host machine.

7. The method of claim 1 wherein the first virtual machine is migrated from the first host machine to the second host machine together with a thin client configured to coordinate scanning with a security virtual machine.

8. The method of claim 1 wherein the first virtual machine is migrated from the first host machine to the second host machine together with a scan cache indicating results of files of the first virtual machine scanned for malware in the first host machine.

9. A computer system for a high-availability virtualization environment, the system comprising:
a first host machine hosting a first plurality of virtual machines, the first host machine being configured to save a scan state of a first virtual machine in the plurality of virtual machines, the scan state indicating status of an incomplete anti-malware scanning of the first virtual machine in the first host machine; and
a second host machine hosting a second plurality of virtual machines, the second host machine being configured to receive the scan state and the first virtual machine, the second host machine being configured to resume execution of the incomplete anti-malware scanning of the first virtual machine based on the scan state.

10. The system of claim 9 wherein the first host machine hosts a first security virtual machine that performs on-demand anti-malware scanning on virtual machines in the first plurality of virtual machines.

11. The system of claim 10 wherein the second host machine hosts a second security virtual machine that performs on-demand anti-malware scanning on virtual machines in the second plurality of virtual machines.

12. The system of claim 11 wherein the second host machine is configured to purge a scan cache of the first virtual machine from the first host machine when the first security virtual machine and the second security virtual machine use different scan engine or pattern version.

13. The system of claim 11 wherein the second host machine is configured to use the scan cache of the first virtual machine from the first host machine when the first security virtual machine and the second security virtual machine use a same scan engine and pattern version.

14. A computer-implemented method of managing anti-malware scanning in a virtualization environment, the method comprising:
a first host machine hosting a first plurality of virtual machines, each virtual machine in the first plurality of virtual machines executing programs like a physical machine;
the first host machine hosting a first security virtual machine that initiates anti-malware scanning on a first virtual machine, the first security virtual machine and the first virtual machine being virtual machines in the plurality of virtual machines;
a second host machine hosting a second plurality of virtual machines, each virtual machine in the second plurality of virtual machines executing programs like a physical machine, the first host machine being separate from the second host machine;
the first host machine migrating the first virtual machine to the second virtual before completion of the anti-malware scanning on the first virtual machine initiated by the first security virtual machine in the first host machine;
the second host machine receiving the first virtual machine together with a scan state of the first virtual machine before the anti-malware scanning on the first virtual machine initiated by the first security virtual machine in the first host machine has completed, the scan state indicating status of the anti-malware scanning on the first virtual machine initiated by the first security virtual machine in the first host machine;
the second host machine scheduling anti-malware scanning on the first virtual machine in the second host machine; and
the second host machine hosting a second security virtual machine that resumes the anti-malware scanning on the first virtual machine initiated by the first security virtual machine in the first host machine, the second security virtual machine being a virtual machine in the second plurality of virtual machines.

15. The method of claim 14 further comprising:
the second host machine receiving the first virtual machine, the first virtual machine including a scan cache indicating results of anti-malware scanning of files of the first virtual machine performed by the first security virtual machine in the first host machine.

16. The method of claim 15 wherein the scan cache of the first virtual machine is employed in the second host machine when the first security virtual machine and the second security virtual machine use a same scan engine and pattern version.

17. The method of claim 14 further comprising:
prior to the second security virtual machine resuming the anti-malware scanning on the first virtual machine initiated by the first security virtual machine in the first host machine: suspending anti-malware scanning on the first virtual machine in the second host machine.

18. The method of claim 14 further comprising:
the second host machine receiving the first virtual machine, the first virtual machine including a thin agent configured to coordinate anti-malware scanning with the first security virtual machine and the second security virtual machine.

19. The method of claim 14 further comprising:
the second host machine hosting the second security virtual machine that is performing an anti-malware scanning on a third virtual machine in the second plurality of virtual machines when the first virtual machine is migrated to the second host machine.

20. The method of claim 14 further comprising:
the second host machine reading the scan state to determine a version of a scan engine and pattern employed to scan the first virtual machine for malware in the first host machine.

* * * * *